United States Patent [19]
Isobe et al.

[11] Patent Number: 6,012,295
[45] Date of Patent: Jan. 11, 2000

[54] AIR CONDITIONING SYSTEM FOR VEHICLES

[75] Inventors: Toshimi Isobe, Isesaki; Keiichi Funakoshi, Saitama, both of Japan

[73] Assignee: Sanden Corporation, Japan

[21] Appl. No.: 09/182,899

[22] Filed: Oct. 30, 1998

[30] Foreign Application Priority Data

Nov. 4, 1997 [JP] Japan .................................. 9-319033

[51] Int. Cl.$^7$ .................................................. F25B 49/00
[52] U.S. Cl. ............................ 62/131; 62/186; 165/204; 454/75
[58] Field of Search ............................ 62/186, 244, 131, 62/126; 165/42, 43, 202, 203, 204; 454/74, 75, 256, 258; 236/49.3

[56] References Cited

U.S. PATENT DOCUMENTS

| | | | |
|---|---|---|---|
| 2,774,227 | 7/1956 | Schjolin et al. | 62/117 |
| 4,344,356 | 8/1982 | Casterton et al. | 98/2.11 |
| 4,365,541 | 12/1982 | Marques et al. | 98/2.11 |
| 4,401,013 | 8/1983 | Ohashi et al. | 98/2.11 |
| 4,612,975 | 9/1986 | Ikari | 165/43 |
| 4,874,036 | 10/1989 | Masuda | 165/42 |
| 5,003,785 | 4/1991 | Petri et al. | 62/131 |
| 5,065,587 | 11/1991 | Howland et al. | 62/131 |
| 5,330,385 | 7/1994 | Hotta et al. | 165/42 X |
| 5,494,097 | 2/1996 | Straub et al. | 62/244 X |

*Primary Examiner*—Harry B. Tanner
*Attorney, Agent, or Firm*—BakerBotts, L.L.P.

[57] ABSTRACT

An air conditioning system for vehicles includes a sensor for detecting opening and closing of a vehicle portal, such as a door or a window, and a control device for selectively opening ports through which temperature controlled air flows into an interior of a vehicle, in response to a signal generated by the opening and closing detecting sensor and a target air temperature. In the system, even if a door or a window of a cabin is opened, ports are opened according to a most suitable port mode depending on the target air temperature at a present time. Therefore, an improved air conditioning state for an operator, and an improved driving condition with reduced waste power and reduced loads to the respective equipment, may be achieved.

7 Claims, 3 Drawing Sheets

AIR CONDITIONING SYSTEM FOR VEHICLES

BACKGROUND OF THE INVENTION

1. Field of the Invention

The present invention relates to an air conditioning system for vehicles, and, more specifically, to an air conditioning system suitable as an air conditioner for a cabin of a work vehicle.

2. Description of the Related Art

In work vehicles, such as power shovels, generally an air conditioner is provided for conditioning air in a cabin. In the vehicle, a door or a window of a cabin, or both, may be opened during vehicle operations. In such conditions, the load for cooling may increase such that it is difficult to achieve a degree of air conditioning comfortable to an operator. For example, when a door or a window is opened in warm weather, the temperature or amount of air blown from an air conditioner is controlled, so that the temperature in a cabin approaches a set temperature. It may be difficult to achieve a comfortable cooling condition by control by such a manner of control and by maintaining a condition in which ports continue to blow out temperature conditioned air as they are. In such a condition, the cooling effect of most of temperature conditioned air may be wasted. Moreover, a heavy load may be applied to a compressor for refrigerant provided in a cooling circuit of the air conditioner, or to a blower for sending air to be conditioned. Therefore, wasted power increases and the operation life of the equipment is reduced. Further, because the compressor usually is driven by utilizing the power of an vehicle engine, the load on the engine increases, and overheating may occur.

SUMMARY OF THE INVENTION

Accordingly, it is an object of the present invention to provide an air conditioning system for work vehicles which may reduce waste power to prolong lives of respective equipments, and which may achieve an improved and comfortable air conditioning state depending on a present condition, by appropriately restricting ports through which temperature conditioned air flows when a door or a window is opened. Preferably, the air conditioning system also appropriately controls the amount of blown air.

To achieve the foregoing and other objects, an air conditioning system for vehicles according to the present invention is provided. The air conditioning system for vehicles according to the present invention comprises means for detecting the opening and closing of a vehicle portal, e.g., a door or a window, and control means for selectively controlling the opening of ports through which temperature controlled air flows into an interior of the vehicle, in response to a signal from the opening and closing detecting means and a target air temperature (a target conditioned air temperature).

In the air conditioning system, the target conditioned air temperature is calculated in the control means. For example, it is calculated based on a difference between a detected inside air temperature, or detected temperature in a cabin, and a set temperature, an outside air temperature, an amount of sunshine, predetermined basic values, or the like. The predetermined basic values may be provided as appropriate amendment values, function coefficients for calculation, etc., in accordance with the types of the air conditioner and the vehicle. Namely, the target conditioned air temperature is a calculated target temperature of air flowing from the air conditioner into the interior of the vehicle for controlling the detected inside air temperature as it approaches the set temperature. Although the control of the target conditioned air temperature is performed preferably by feed back control, it may be performed by feed forward control.

In the air conditioning system, it is preferred that the control means further controls an amount of air flowing into the interior of the work vehicle through ports selectively opened by the control means, in accordance with a signal from the opening and closing detecting means and a target conditioned air temperature. The amount of air flow may be controlled by controlling the rotational speed of a blower provided in the air conditioner. The rotational speed of the blower may be controlled by controlling the voltage applied to the blower.

Further, in an embodiment, the control means restricts a port to be opened only to a face mode port, when a signal to open is input from the opening and closing detecting means, and the target conditioned air temperature is lower than a predetermined value, such as 25° C. By this control, spot cooling for an operator and reduction of the amount of air flow are each achieved. Moreover, the system may achieve an improved degree of air conditioning in accordance with a present condition and an improved driving condition suppressing waste power may be realized.

In another embodiment according to the present invention, even if a door or a window of a cabin is opened, ports to be opened are limited to those most suitable ports, depending on the target conditioned air temperature at a present time. Therefore, an improved air conditioning state for an operator, and an improved driving condition with reduced waste power and reduced loads to the respective equipment, may be achieved. Particularly in summer, because it is difficult to reduce the temperature of the cabin to a desired low temperature when a door or a window is opened, such as restricting a port to be opened only to a face mode port, a comfortable spot cooling may be achieved. Moreover, because the face mode originally has a small value of maximum air amount, the controlled air amount also may be reduced. Therefore, waste power may be reduced, the load applied to a blower or a compressor in a cooling circuit may be reduced, and the lives of the respective equipment may be extended. Further, control may shift to another mode depending on the condition, by appropriately restricting the positions of the ports to be opened and the amount of air flow may similarly achieve an improved comfortable air conditioning and an improved driving condition reducing waste power.

Further objects, features, and advantages of the present invention will be understood from the following detailed description of preferred embodiments of the present invention with reference to the accompanying figure.

BRIEF DESCRIPTION OF THE DRAWING

A preferred embodiment of the invention is now described with reference to the accompanying figures, which is given by way of example only, and is not intended to limit the present invention.

DETAILED DESCRIPTION OF THE PREFERRED EMBODIMENTS

Figure 1:
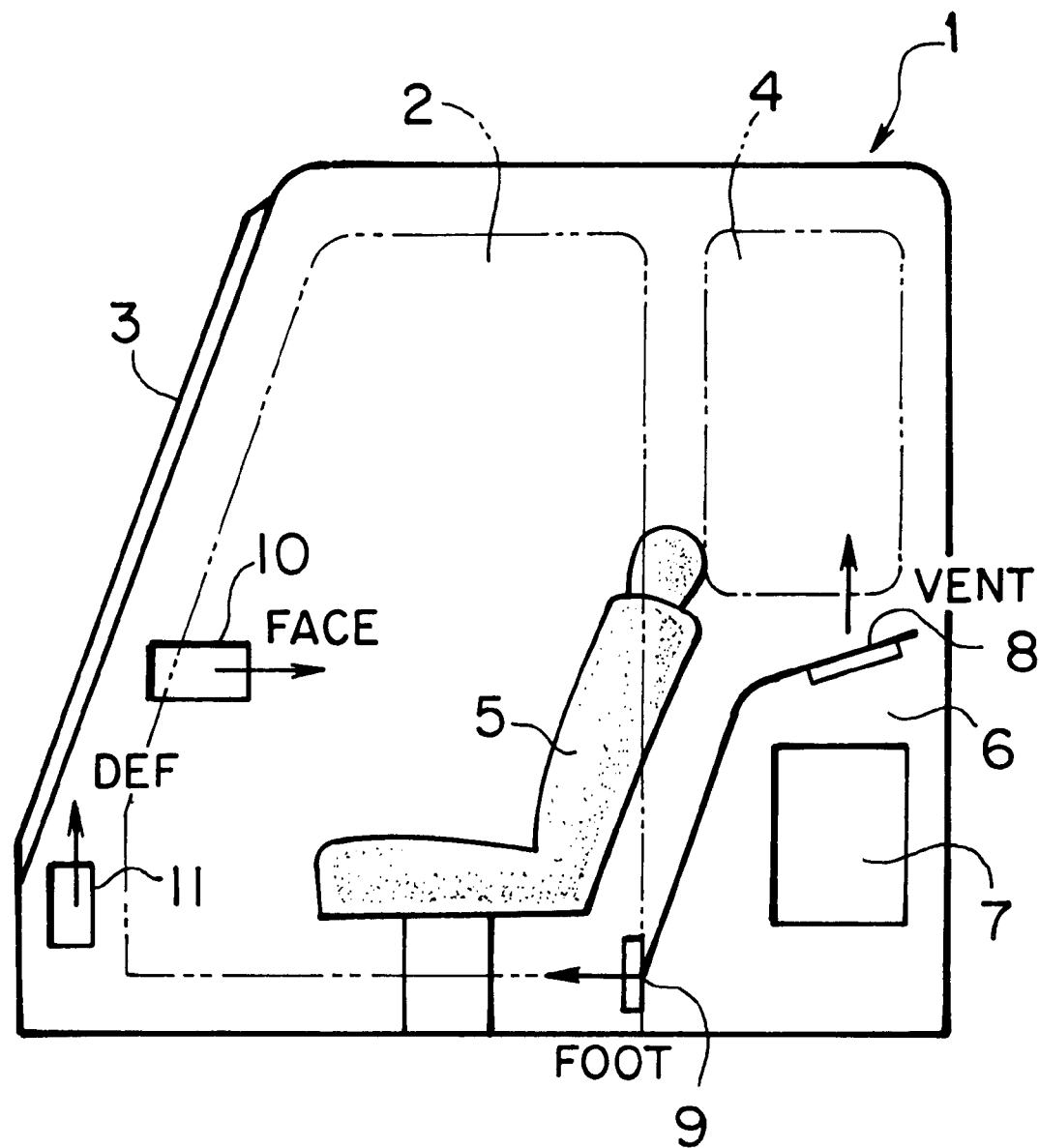
FIG. 1 is a schematic vertical sectional view of a cabin of a work vehicle using an air conditioning system according to an embodiment of the present invention.
Figure 2:
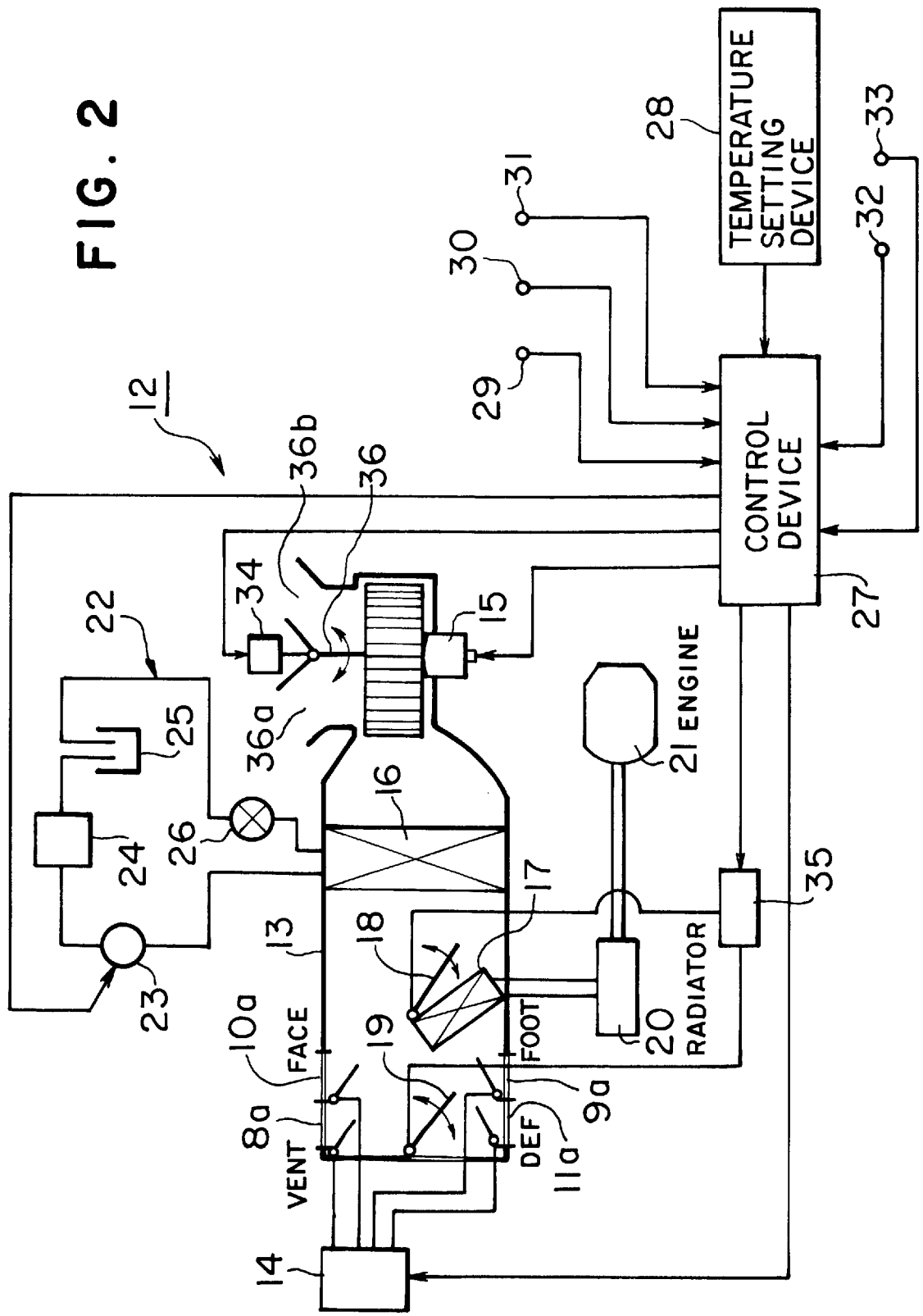
FIG. 2 is a schematic diagram of the air conditioning system according to an embodiment of the present invention.

FIGS. 1 and 2 show an embodiment of an air conditioning system for work vehicles according to the present invention. FIG. 1 depicts a cabin 1, and FIG. 2 depicts an air conditioner provided to the work vehicle. In FIG. 1, cabin 1 has a door 2, a front window 3, a rear side window 4, and an operator's, or driver's, seat 5. Main body 7 of the air conditioner is provided in a parts compartment 6 disposed at a rear position in cabin 1. Compartment 6 also contains other parts such as vehicle's electronic control unit and other electric parts. The temperature conditioned air from main body 7 of the air conditioner flows into cabin 1 through selectively opened ports from among a plurality of ports toward the inside of cabin 1. In an embodiment, the ports comprise VENT mode port 8, FOOT mode port 9, FACE mode port 10 and DEF mode port 11. In another embodiment, the ports are automatically selected in an automatic mode. In still another embodiment the ports are manually selected by an operator in a manual mode.

FIG. 2 depicts air conditioner 12 in accordance with the present invention. At one end portion of air duct 13, VENT mode air port 8a, FOOT mode air port 9a, FACE mode air port 10a, and DEF mode air port 11a are provided. The VENT mode air port 8a, FOOT mode air port 9a, FACE mode air port 10a, and DEF mode air port 11a communicate with VENT mode port 8, FOOT mode port 9, FACE mode port 10, and DEF mode port 11, each of which opens into cabin 1. In one embodiment, these ports 8a, 9a, 10a, and 11a are controlled to be opened and closed by a single port switching actuator 14, individually, or, in combination.

A blower 15 is provided in the other end portion of air duct 13. A switching damper 36 controls the mixing ratio of inside air sucked through inside air port 36a to outside air sucked through outside air port 36b. The operation of switching damper 36 is controlled by switching damper actuator 34. Air drawn from inside or outside the cabin or mixed air is forced by blower 15 into air duct 13.

An evaporator 16 for refrigerant and a heater core 17 are disposed in air duct 13 in this order, from the upstream side to the downstream side. An air mixing damper 18 is provided at a position immediately upstream of heater core 17 for adjusting the mixing ratio of air passing through heater core 17 to air bypassing heater core 17. The operation of air mixing damper 18 is controlled by air mixing damper actuator 35. A cool max damper 19 for enabling a cool max mode is provided at a position downstream of heater core 17 and between VENT mode air port 8a, FACE mode air port 10a, and FOOT mode air port 9a, DEF mode air port 11a. Water from radiator 20 is circulated into heater core 17. This radiator water also is used as cooling water for engine 21.

Refrigerant is circulated in cooling, or refrigerant, circuit 22. Cooling circuit 22 includes an evaporator 16, a compressor 23 for compressing refrigerant sent from evaporator 16, a condenser 24 for condensing refrigerant sent from compressor 23, and a reservoir tank 25 and expansion valve 26.

A controlled temperature in cabin 1 is set in temperature setting device 28, and the controlled temperature signal for the set temperature is input to control device 27. In temperature setting device 28, either an automatic mode or a manual mode is selected. The signals for the interior air temperature detected by inside air temperature sensor 29, outside air temperature detected by outside air temperature sensor 32, and the amount of sunshine detected by sunshine sensor 33 are input to control device 27. Control device 27 sends control signals to blower 15, switching damper actuator 34, compressor 23, air mixing damper actuator 35, and cool max damper 19, respectively. The voltage applied to blower 15 may be controlled, so that the amount of blown air may be adjusted steppedly, or, in the alternative, continuously between a low level (L) and a high level (H).

A signal from a sensor 30 detecting the opening and closing operation of door 2 and a signal from a sensor 31 detecting the opening and closing operation of front window 3 are input to control device 27. These opening and closing detecting sensors 30 and 31 may comprise any type of sensors known in the art such as touch sensors or limit switches.

In the air conditioner, the control of air temperature according to the present invention is performed as follows. The following control is shown as an example only, and the present invention is not limited thereto.

In control device 27, the air ports to be opened are determined and controlled in accordance with the signal from door opening and closing detecting sensor 30 and window opening and closing detecting sensor 31 and the target conditioned air temperature calculated in the control device 27. In addition to this control, the amount of air flow (e.g., the amount of voltage supplied to the blower) from blower 15 is controlled, for example, as depicted in Table 1. As mentioned above, the target conditioned air temperature may be determined by calculation in control device 27, based on a temperature difference between the interior air temperature detected inside air temperature sensor 29 and the temperature set by temperature setting device 28, the exterior air temperature detected by outside air temperature sensor 32, the amount of sunshine detected by sunshine sensor 33, predetermined basic control values and coefficients, or the like.

When the signal generated by the operation of door opening and closing detecting sensor 30 and window opening and closing detecting sensor 31 is input, in accordance with a target conditioned air temperature (TOC) at that time, the control is forcibly switched to the following conditions by stopping automatic or manual control in accordance with the control conditions of C1 to C4 shown in Table 1.

In automatic control mode, when the condition is in the target conditioned air temperature (TOC)$\leq 25°$ C. (cooling mode in this condition), the port to be opened is forcibly restricted only to FACE mode port, although the ports including VENT mode port have been opened in the usual automatic control mode by the time of this switching, depicted as C1 in Table 1. Namely, the condition is restricted to a local cooling through FACE mode port. In this case, the voltage delivered to blower 15, which determines the amount of air flow, is controlled according to line A depicted in FIG. 3, which is a condition in the automatic mode depicted as C2 in Table 1. FACE mode port originally is a port with a small value of maximum air amount reduced by adjustment of pressure loss of a duct communicating between FACE mode port 10 opened into cabin 1 and FACE mode air port 10a opened on air duct 13. By restricting only to FACE mode port, comfortable spot cooling for an operator may be achieved, while reducing the amount of air flow, thereby reducing the consumptive power of blower 15 and compressor 23, even when door 2 or window 3 is opened.

When the condition is 25° C.$\leq$TOC$\leq$40° C., the control may be a bilevel mode, in which relatively cold air flows into the upper side of the interior of cabin 1, and relatively warm air flows into the lower side. Because the air amount in the bilevel mode is relatively small, the amount of air flow, as determined by the voltage delivered to blower 15, may remain unchanged under the automatic mode, as depicted by line A in FIG. 3. By this control to the bilevel mode, in accordance with the TOC at the present time, an air conditioning state comfortable to an operator may be obtained, as well as a reduction in the load for cooling and the amount of air flow. In addition, the consumptive power of blower 15 and compressor 23 may be reduced.

When the condition is in 40° C.≦TOC (heating mode in this condition), the port to be opened is forcibly restricted only to FOOT mode port. The amount of air flow, determined by the voltage of blower 15, remains unchanged under the automatic mode (amount at a usual FOOT mode), as depicted by line A in FIG. 3. The drive of compressor 23 is forcibly turned off. In this condition, effective heating may be performed by restricting air flow to the FOOT mode port. Moreover, the consumptive power for compressor 23 is not needed and compressor 23 may be turned off.

Figure 3:
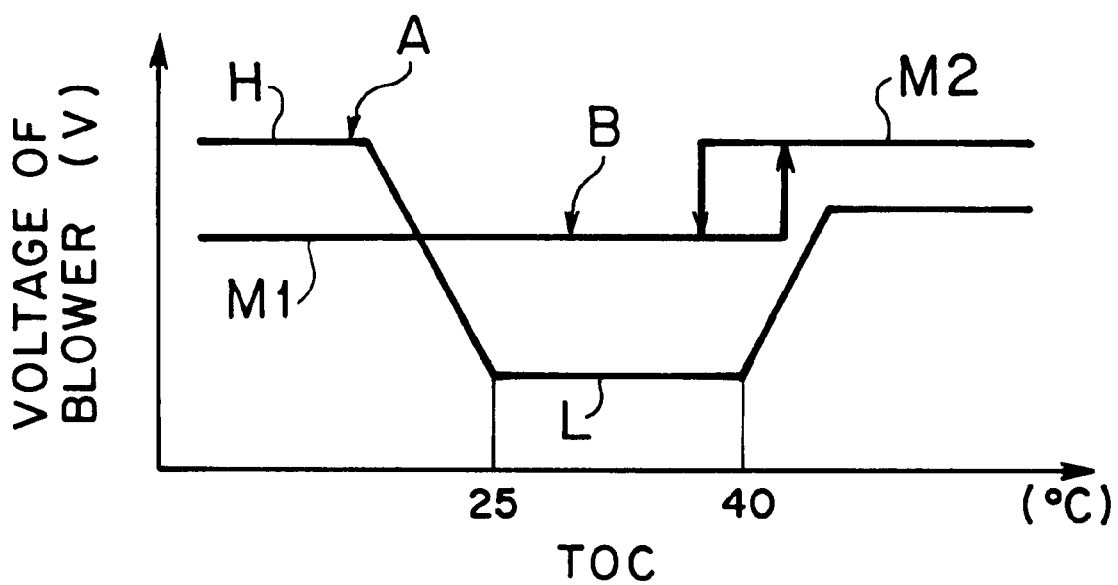
FIG. 3 is a schematic diagram showing the control of the voltage of a blower in the system depicted in FIG. 2.

When the control is in the automatic mode, the control may be switched to a manual mode to manually select the ports to be opened. Because, however, door 2 or window 3 is open, the manual setting of air flow amount, or setting of blower voltage, may be restricted, as depicted by line B in FIG. 3, to prevent excessive power consumption, as depicted by C3 in Table 1. As depicted by line B in FIG. 3, when the manual setting of air amount is possible at one of four levels of L (low), M1, M2 (between M1 and H), or H (high), the amount of air flow may be restricted to M1 level in the low and middle temperature ranges of TOC. By this restriction, even in the manual mode, an air conditioning state, which is as comfortable as possible in accordance with the present condition, may be achieved, in addition to a reduction in the load for cooling and the amount of air flow. Moreover, the consumptive power of blower 15 and compressor 23 may be reduced. Although line B in FIG. 3 is provided with a hysteresis on the release portion for the above-described restriction, the hysteresis does not have a particular relation with the control according to the present invention.

When the manual mode is initially selected and when VENT mode port is opened to a large amount, the restriction control may be performed similarly to that in the above-described automatic mode, by inputting the signal generated by the opening of door 2 or window 3 and in accordance with the present TOC, such as the condition of TOC≦25° C., 25° C.≦TOC≦40° C., or 40° C.≦TOC, depicted as C4 in Table 1. However, because the control is under manual mode, the amount of air flow may be restricted by the line B depicted in FIG. 3, as described above. Further, if the port to be opened is changed in the manual mode, the control may be restricted by line B of FIG. 3, as depicted in Table 1.

The above-described restriction control is released when the signal generated by the opening of door 2 or window 3 disappears. By the release, the control returns to a normal automatic or manual control mode.

Although the signal generated by the opening of a window is a signal from front window 3 in the control of one embodiment, a signal generated by the opening of a rear side window 4 or a rear window (not shown), or a window positioned at a side opposite to door 2 (not shown), may be used. Further, when a signal generated by the opening of a door or a window is input, a buzzer may be rung or a lamp may be activated as a warning. Moreover, the buzzer or the lamp may be operated to indicate when the restriction control according to the present invention is completed.

Although only embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. An air conditioning system for a vehicle comprising:

means for detecting opening and closing of an at least one vehicle portal; and control means for selectively controlling opening of ports through which temperature controlled air flows into an interior of said vehicle, in response to a signal generated by said opening and closing detecting means and a target air temperature.

2. The air conditioning system according to claim 1, wherein said control means further controls an amount of air flowing into said interior of said vehicle through ports selectively opened by said control means.

3. The air conditioning system according to claim 1, wherein said target conditioned air temperature is a calculated temperature including at least one value corresponding to a difference between a detected temperature in a cabin and a set temperature for said cabin.

4. The air conditioning system according to claim 1, wherein said control means only opens a face mode port, when a signal generated by the opening is input from said opening and closing detecting means, and said target air temperature is less than a predetermined value.

5. The air conditioning system according to claim 1, wherein said air conditioning system includes a cooling circuit comprising a compressor for compressing refrigerant, a condenser for condensing refrigerant, and an evaporator disposed in an air duct for evaporating refrigerant.

6. The air conditioning system according to claim 1, wherein said at least one vehicle portal is a door.

TABLE 1

| Signal of opening | | Automatic mode | | Manual mode | | Return of control |
|---|---|---|---|---|---|---|
| | | Port | Air amount | Port | Air amount | |
| present | Control mode Possibility of manual mode | C1 possible | C2 C3 | C4 possible | C3 C3 | no signal |

C1, C2, C3, C4: described in the specification

7. The air conditioning system according to claim 1, wherein said at least one vehicle portal is a window.

* * * * *